United States Patent [19]

Melke

[11] 4,044,853

[45] Aug. 30, 1977

[54] DRIVERLESS VEHICLE AND GUIDANCE SYSTEM

[75] Inventor: George A. Melke, Charlevoix, Mich.

[73] Assignee: Jervis B. Webb Company, Farmington Hills, Mich.

[21] Appl. No.: 674,052

[22] Filed: Apr. 5, 1976

[51] Int. Cl.² .......................................... B60K 26/00
[52] U.S. Cl. .................................. 180/98; 180/19 S; 318/587
[58] Field of Search ............. 180/98, 140, 19, 77 HT; 340/53; 318/587; 280/91

[56] References Cited

U.S. PATENT DOCUMENTS

| | | | |
|---|---|---|---|
| 3,411,603 | 11/1968 | Kohls | 180/98 |
| 3,498,403 | 3/1970 | Kohls | 180/98 |
| 3,557,893 | 1/1971 | Kohls | 180/19 |
| 3,912,037 | 10/1975 | Krieg | 180/98 |
| 3,948,342 | 4/1976 | Pircher | 180/98 |
| 3,968,559 | 7/1976 | Karlsson | 180/98 X |

FOREIGN PATENT DOCUMENTS 1,955,758  5/1971  Germany .......................... 180/98

Primary Examiner—Philip Goodman
Assistant Examiner—Terrance L. Siemens
Attorney, Agent, or Firm—Joseph W. Farley

[57] ABSTRACT

A driverless vehicle has an elongated frame supported at each of its ends by a steerable wheel and a castor wheel, the steerable wheels being mounted in longitudinal alignment, and one of the steerable wheels is reversibly driven. Each steerable wheel is individually controllable by a guidance system including a steering motor, forward and reverse direction sensing units which obtain a steering signal from a guide path, and a circuit for controlling the steering motor in response to the steering signal. In automatic operation of the vehicle, the individually controllable steerable wheels will follow a common guide path or separate guide paths so that the vehicle can move forwardly, rearwardly and laterally. Manual controls enable an operator to steer and energize the drive wheel, to steer the other steerable wheel and to separately activate and deactivate the guidance systems for the steerable wheels.

11 Claims, 5 Drawing Figures

DRIVERLESS VEHICLE AND GUIDANCE SYSTEM

This invention relates generally to improvements in a self-propelled driverless vehicle having a guidance system which enables the vehicle to automatically follow a guide path such as defined by the magnetic field surrounding a guide wire energized at a certain frequency.

In particular, the present invention is directed to providing a driverless vehicle which has front and rear steerable wheels individually controlled by separate guidance systems so that the vehicle is operable automatically with the steerable wheels following a common guide path of following separate guide paths. The invention enables a driverless vehicle, especially one having a relative long wheelbase, to precisely follow a desired guide path and to move laterally as well as longitudinally in both forward and reverse directions. Manual controls are also provided which enable the vehicle to be driven manually off of the guide path and to be placed back on the guide path for automatic operation.

According to the invention, a driverless vehicle includes a frame having a front end and a rear end; wheel means for supporting the frame including a front steerable wheel mounted for steering movement about a steering axis located adjacent to the front end of the frame, a rear steerable wheel mounted for steering movement about a steering axis adjacent to the rear end of the frame, each of said steerable wheels having a steering motor arranged to move such steerable wheel about the steering axis thereof; a guidance system for independently regulating the operation of the steering motor for each of the steerable wheels, said guidance system including for each steerable wheel a direction sensing unit adapted to produce steering signals from the guide path, and circuit means for regulating the operation of the steering motor in response to said steering signals; and, drive means operably connected to one of said steerable wheels for propelling the vehicle.

Preferably, the drive means is reversible and the guidance system for independently regulating the operation of the steering motor for each of the steerable wheels includes for each steerable wheel a forward direction sensing unit and a rearward direction sensing unit which are mounted forwardly and rearwardly respectively of the steerable wheel and which are preferably movable with the steering movements of the steerable wheel. These forward and rearward direction sensing units are adapted to produce steering signals from the guide path when the vehicle is traveling in the forward and in the rearward direction respectively.

The guide path may include a pair of portions defining separate paths of travel for the front and rear steerable wheels of the vehicle, and such a pair of guide path portions may be arranged in parallel relation at a spacing corresponding to the spacing longitudinally of the vehicle between the front and rear steerable wheels. Such a pair of parallel portions may be employed to define a guide path over which the vehicle travels with a lateral component of motion.

Means are provided for manually controlling the vehicle, preferably by a manual steering means operably associated with the steerable wheel to which the reversible drive means is connected, by manual controls for operating the reversible drive motor, and by manual controls for selectively and independently operating the circuit means which regulate the operation of the steering motor for the front steerable wheel and the steering motor for the rear steerable wheel.

Other features and advantages of the invention will appear from the description to follow of the representative embodiment disclosed in the accompanying drawings.

DESCRIPTION OF THE PREFERRED EMBODIMENT

Figure 1:
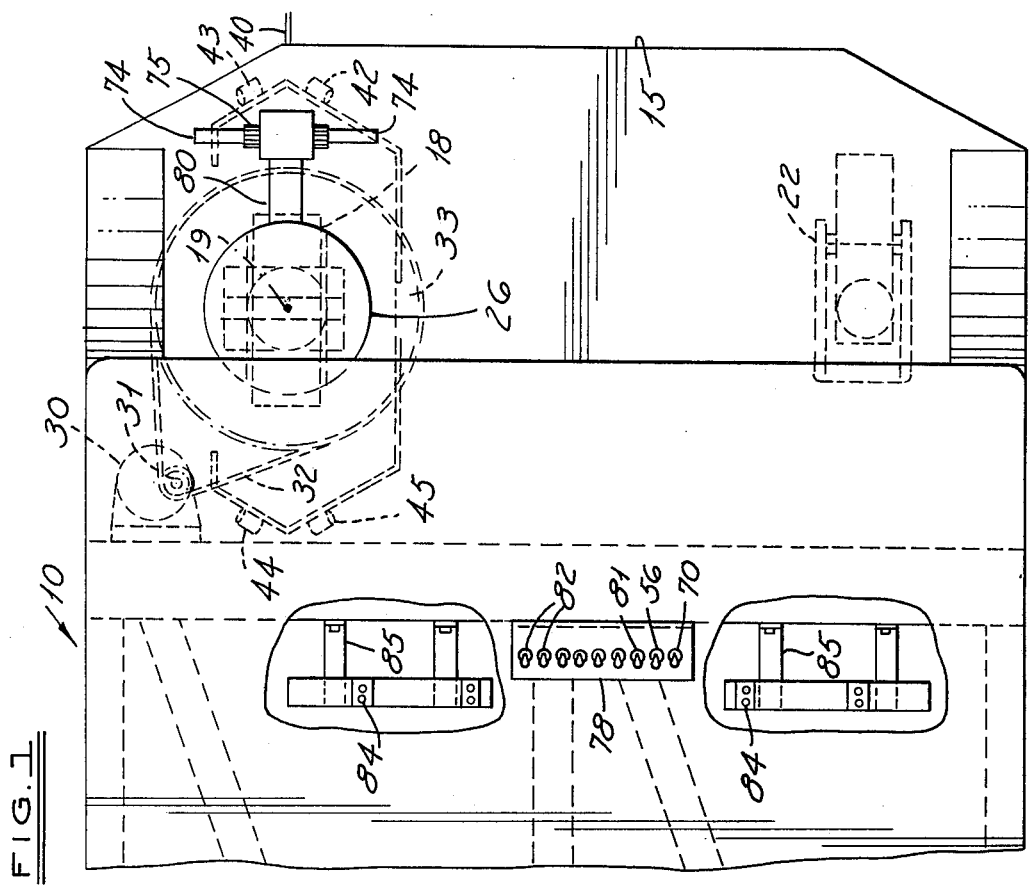
FIG. 1 is a plan view of a driverless vehicle constructed in accordance with the invention.
Figure 1:
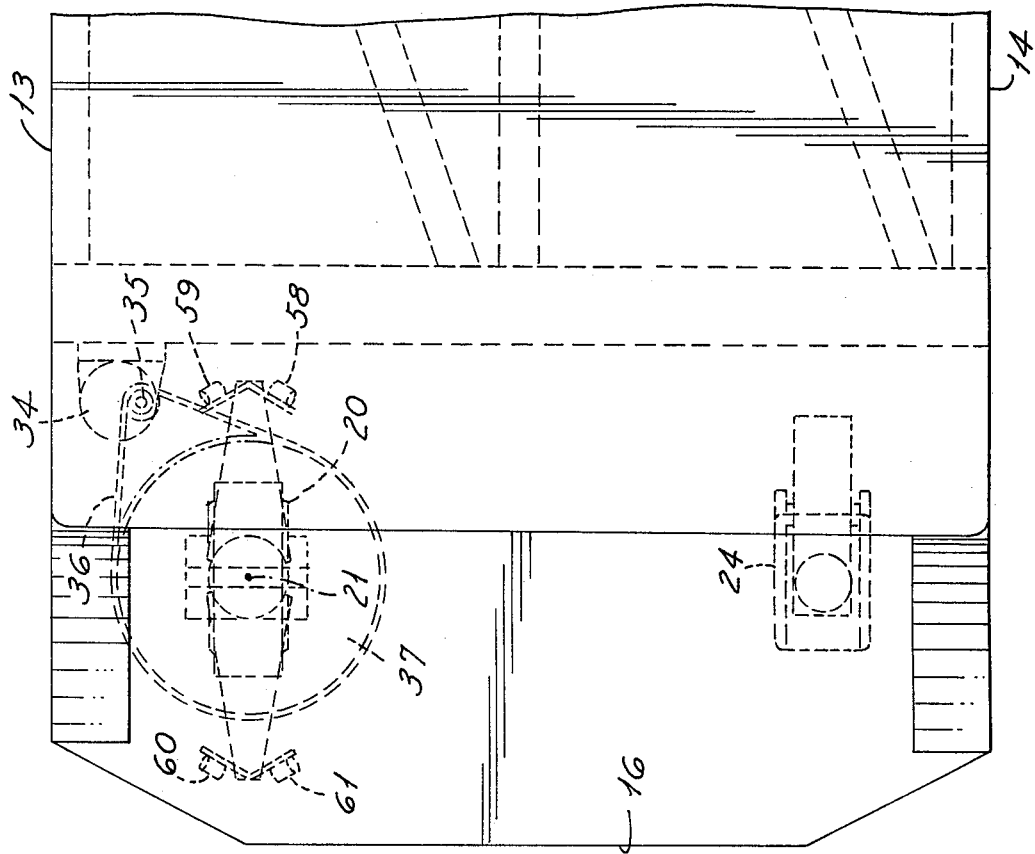
Figure 2:
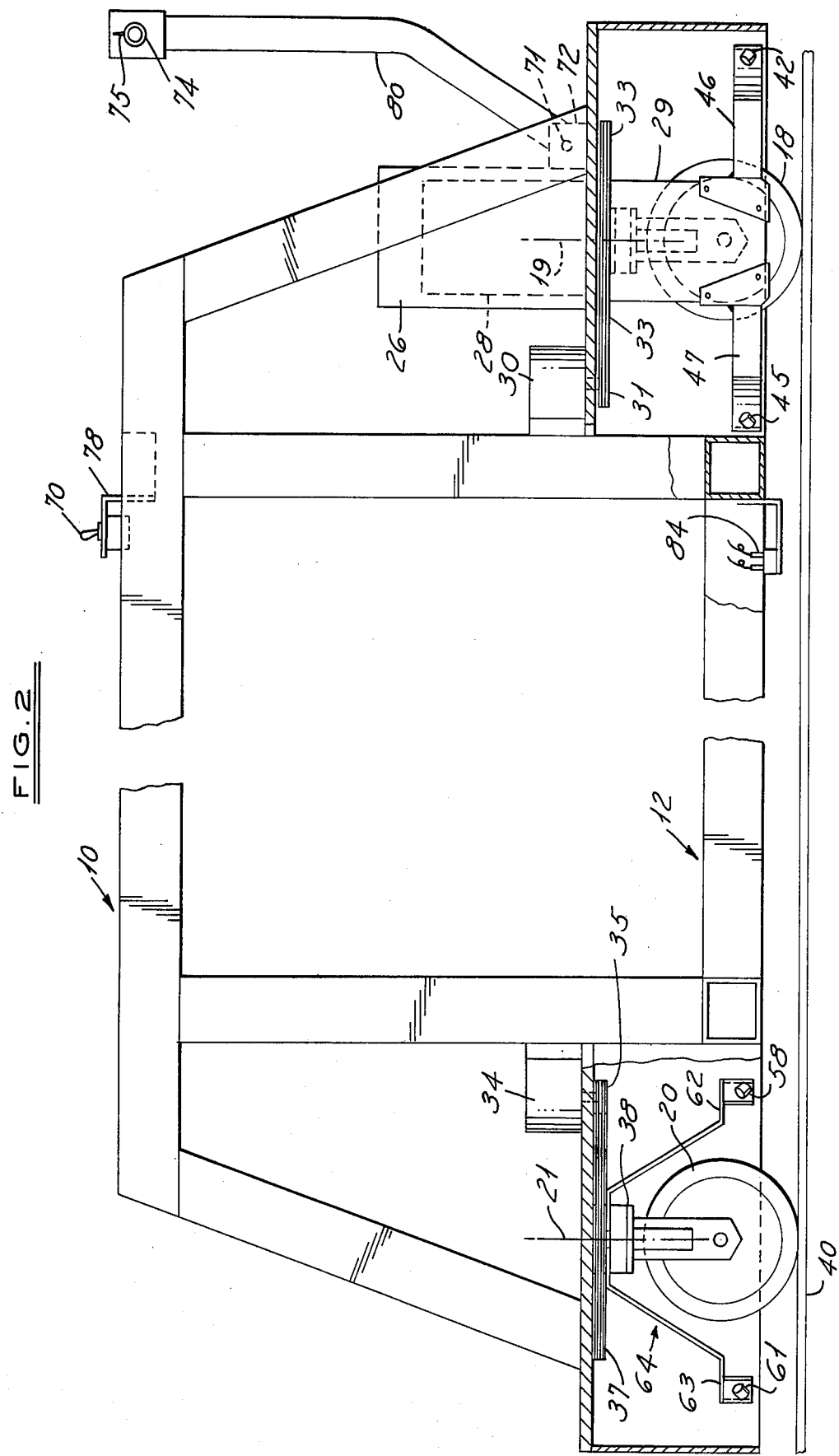
FIG. 2 is a side elevation, partly in section, of the driverless vehicle shown in FIG. 1.

Referring to FIGS. 1 and 2, a driverless vehicle 10 constructed in accordance with the invention includes a suitable frame 12 having sides 13 and 14, a front end 15 and a rear end 16. The terms "front" and "rear" are used for convenience only to differentiate the ends of the vehicle. As will be more fully explained herein, the vehicle is preferably reversible so that when the vehicle is in motion, the terms front and rear are actually interchangeable as far as the direction of movement of the vehicle is concerned.

The frame 12 is supported by suitable wheel means comprising a front steerable wheel 18 mounted for steering movement about a steering axis 19 located adjacent to the front end 15 of the frame 12, a rear steerable wheel 20 mounted for steering movement about a steering axis 21 located adjacent to the rear end of the frame, and front and rear castor wheels 22 and 24, respectively. The front and rear steerable wheels 18 and 20 are aligned with each other longitudinally of the frame, as are the front and rear castor wheels 22 and 24.

The front steerable wheel 18 is part of a reversible drive unit such as used commerically on industrial trucks, and therefore is only shown schematically in FIGS. 1 and 2. Such a drive unit 26 is rotatably supported on the steering axis 19 by a suitable bearing 27 attached to the frame 12, and includes a reversible electric drive motor 28, and suitable means operably connecting the motor to the steerable wheel 18, such means being in part contained within a downwardly extending housing 29 located to one side of the steerable wheel 18. The drive unit 26 and steerable wheel 18 is movable about the axis 19 by a steering motor 30 having a sprocket 31 which is connected by a drive chain 32 to a sprocket 33 suitable secured to the drive unit 26.

The rear steerable wheel 20 is also movable about its steering axis 21 by a steering motor 34 having a sprocket 35 connected by a chain 36 to a sprocket 37 suitably secured to a bracket 38 that supports the rear steerable wheel 20.

Figure 4:
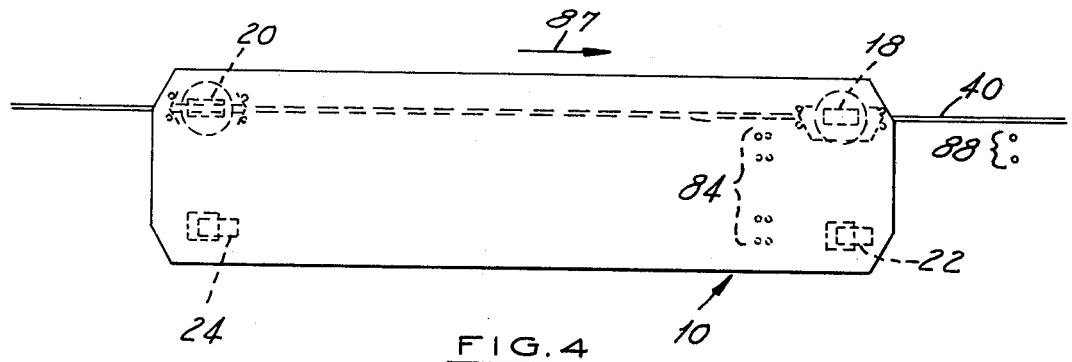
FIG. 4 is a schematic plan view showing the driverless vehicle of the invention in relation to a common guide path for the front and rear steerable wheels; and, FIG. 5 is a schematic plan view showing the driverless vehicle of the invention in relation to a pair of parallel guide paths.

As indicated in FIG. 4, the vehicle 10 is movable forwardly and rearwardly along a guide path 40 such as defined by the magnetic field which surrounds a guide wire energized at a certain frequency. Normally the guide wire 40 is mounted in a slot cut in the surface over which the vehicle 10 travels, as indicated in FIG. 2. A guidance system is provided for independently regulating the operation of each of the steering motors 30 and 34 for the front and rear steerable wheels 18 and 20 in order to enable each steerable wheel to independently follow the guide path defined by the guide wire 40.

For the front steerable wheel 18, the guidance wheel 18, the guidance system includes a forward direction sensing unit consisting of a right sensing coil 42 and a left sensing coil 43; and a rearward direction sensing unit consisting of a right sensing coil 44 and a left sensing coil 45. Each of the coils 42–45 is tuned to the frequency at which the guide wire 40 is energized, and the forward and rearward direction sensing units provided by the coils 42–45 are mounted forwardly and rearwardly respectively of the steering axis 19 of the front steerable wheel 18 by suitable means such as the brackets 46 and 47 secured to the housing 29 of the drive unit. The brackets 46 and 47 are so constructed that the coils 42 and 43 of the forward direction sensing unit and the coils 44 and 45 of the rearward direction sensing unit are equidistantly located from the steering axis 19.

Figure 3:
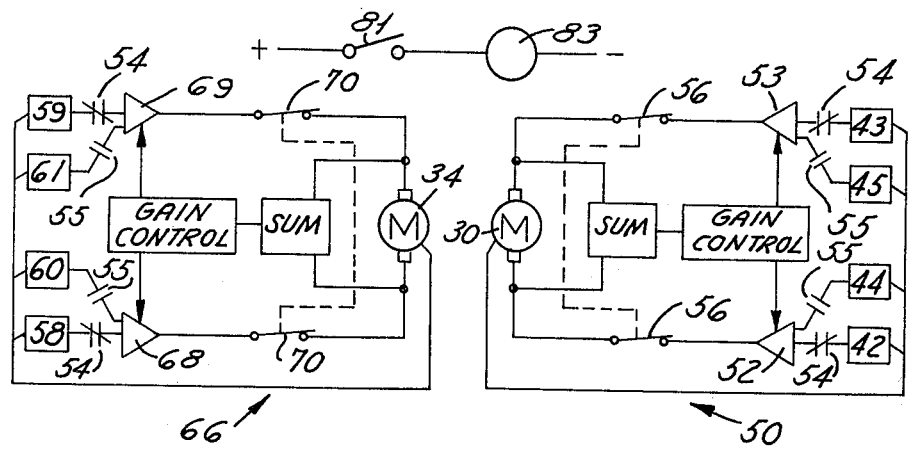
FIG. 3 is a schematic diagram illustrating the major components of the guidance system of the vehicle.

The sensing coils 42–45 are connected in circuit means 50 shown in FIG. 3 for regulating the operation of the front steering motor 30 in response to steering signals induced in the coils from the guide wire field. Such a circuit 50 is disclosed in greater detail in U.S. Pat. No. 3,498,403, and in view of the disclosure of that patent, the circuit 50 is shown only schematically herein. Steering signals from the right and left coils 42 and 43 of the forward direction sensing unit are fed to right and left amplifiers 52 and 53, respectively, through contacts 54 of a forward-reverse relay 83, which contacts are shown in closed position for forward operation of the vehicle. For reverse operation, the contacts 54 would be opened by the forward-reverse relay to disconnect the forward sensing coils 42 and 43; and, the right and left coils 44 and 45 of the rearward direction sensing unit would be connected to their respective amplifiers 52 and 53 by the closing of the relay contacts 55. A manually operable switch 56 is provided in the connections from the amplifiers 52 and 53 to the steering motor 30 so that the circuit 50 can be selectively rendered operable or inoperable.

Corresponding guidance components are provided for the rear steerable wheel 20. Forward right and left sensing coils 58 and 59, and rearward right and left sensing coils 60 and 61 are mounted respectively on a forward portion 62 and a rearward portion 63 of a bracket 64 which is mounted on the bracket 38 of the rear steerable wheel and which moves with steering movements of the steerable wheel 20 about the steering axis 21. These steering coils 58–61 are connected in a circuit 66 which is similar in all respects to the circuit 50 described above and includes forward contacts 54 and reverse contacts 55 operated by the forward-reverse relay, right and left amplifiers 68 and 69, and a manually operable switch 70.

Other manual controls for the vehicle 10 are shown in FIGS. 1 and 2. A tiller 80 is connected by a horizontal pivot 71 to a bracket 72 on the drive unit 26, and is movable about the pivot 71 from the vertical position shown in FIG. 2 toward a more horizontal position in which an operator can employ the tiller to manually steer the front steerable wheel 18. The tiller is equipped at its outer end with hand grips 74 provided with control means 75 for manually regulating the speed and direction of the drive motor 28. A control panel 78 mounted on the front of the frame is provided with the switch 81 required to operate the forward-reverse relay 83 and with the control circuit switches 56 and 70.

The control panel 78 may also include suitable switches 82 for controlling the route and destination of the vehicle in accordance with the teaching of U.S. Pat. No. 3,411,603.1 For this purpose, the vehicle 10 is provided with banks of polarized reed switches 84 carried by brackets 85 attached to the vehicle frame, these reed switches being responsive to the position and polarity of permanent magnets placed in code combinations in the surface over which the vehicle travels. A certain magnet code can be employed either to identify a destination at which the vehicle is to stop, or to identify a junction in the guide path at which either or both of the sensing coils 43–45 for the front steerable wheel and the sensing coils 58–61 for the rear steerable wheel can be switched to respond to a different guide wire frequency.

In FIG. 4, the vehicle 10 is shown proceeding in the direction indicated by the arrow 87 with the front steerable wheel 18 and the rear steerable wheel 20 following a common guide wire 40. A pair of permanent magnets 88 are shown to one side of the guide wire 40 and identify a destination at which the vehicle may be instructed to stop by the previous operation of one of the switches 82 on the control panel. When a pair of the reed switches 84 passes over the permanent magents 88, a control circuit will be activated, the vehicle drive motor 28 will be de-energized and the vehicle will stop.

Figure 5:
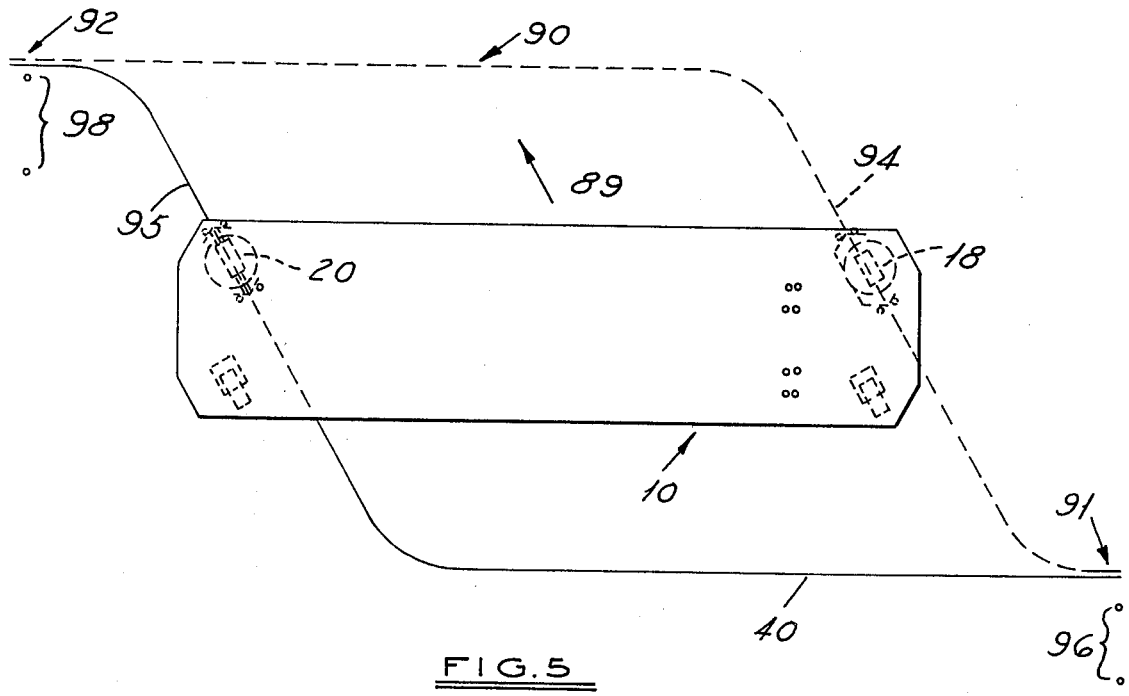

In FIG. 5, the vehicle 10 is shown proceeding in the direction indicated by the arrow 89 along a guide path defined by the guide wire 40 and by a second guide wire 90 which is shown in broken line to indicate that it is energized at a frequency different from that of the guide wire 40. The guide wire 90 diverges from the guide wire 40 at a switch point 91, rejoins the guide wire 40 at a switch point 92, and includes portions arranged in generally parallel relation to the guide wire 40. One portion 94 of the guide wire 90 is arranged relative to one portion 95 of the guide wire 40 in generally parallel relation and at a spacing corresponding to the spacing longitudinally of the vehicle between the front steerable wheel 18 and the rear steerable wheel 20. When the vehicle 10 approaches the switch point 91 from the right of the view as seen in FIG. 5, the rear steerably wheel 20 continues on the guide wire 40. A pair of permanent magnets 96 located at the switch point 91 operate a pair of the reed switches 84 which cause the sensing coils 44 and 45 in the guidance system for the front steerable wheel 18 to respond to the frequency of the guide wire 90. Hence the front steerable wheel 18 follows the guide wire 90 and the vehicle 10 moves generally laterally with the steerable wheels 18 and 20 following the separate guide wire paths. When the vehicle 10 reaches the switch point 92, a pair of permanent magnets 98 located thereat operate another pair of the reed switches 84 which cause the sensing coils 44 and 45 of the front steerable wheel 18 to return to the frequency of the guide wire 40.

Other guide wire configurations and combinations can obviously be employed, as desired, to cause the front and rear ends of the vehicle 10 to precisely follow a defined path and thereby enable a vehicle having a relatively long wheel base to be automatically steered as desired in confined areas and in multiple directions — forwardly, rearwardly and laterally.

When it is desired to operate the vehicle manually, the control circuit switches 56 and 70 are opened and an operator manually drives the vehicle wherever desired by operation of the tiller 80 and the control 75 to regulate the direction and speed of the vehicle. Other forms of manual control could of course be provided, such as a form of steering that would permit the operator to ride on the vehicle and/or to regulate the direction of travel by manually energizing either or both of the steering motors 30 and 34. Placement of the vehicle back on the guide path is facilitated by the independently operable control circuit switches 56 and 70. The operator may maneuver the vehicle so as to place the sensing coils 58-61 of the rear steerable wheel 20 over the guide wire 40 and then close the control circuit switch 70 so that the rear steerable wheel 20 will automatically follow the guide path while the front steerable wheel is being manually aligned with the guide path.

While the invention has been described employing a magnetic type of guidance system using an energized guide wire, the optic type of guidance system can also be used, and the term "guidance system" as used in the claims appended hereto is intended to embrace both the magnetic and optic type of guidance.

I claim:

1. A driverless vehicle movable along a guide path provided on a surface over which the vehicle travels;
    said vehicle including a frame having a front end and a rear end;
    wheel means for supporting the frame including a front steerable wheel mounted for steering movement about a steering axis located adjacent to the front end of the frame, a rear steerable wheel mounted for steering movement about a steering axis located adjacent to the rear end of the frame, each of said steerable wheels having a steering motor arranged to move such steerable wheel about the steering axis thereof;
    a guidance system for independently regulating the operation of the steering motor for each of the steerable wheels, said guidance system including for each steerable wheel a direction sensing unit adapted to produce steering signal from the guide path, and separate circuit means for regulating the operation of each steering motor in response to said steering signals whereby each of the steerable wheels is independently controlled to follow the guide path; and,
    drive means operably connected to one or more of said steerable wheels for propelling the vehicle.

2. A driverless vehicle according to claim 1 wherein the guide path includes a pair of portions defining separate paths of travel of said front and rear steerable wheels.

3. A driverless vehicle according to claim 2 wherein said pair of guide path portions are arranged in parallel relation at a spacing corresponding to the spacing longitudinally of the vehicle between said front and rear steerable wheels.

4. A driverless vehicle according to claim 2 wherein one of said pair of portions has a path defining characteristic which differs from the path defining characteristic of the other of said pair of portions, and the direction sensing unit of one of said steerable wheels is adaptable to produce steering signals from said one portion while the direction sensing unit of the other of said steerable wheels is adapted to produce steering signals from the other of said portions.

5. A driverless vehicle according to claim 4 wherein the path defined by said one portion diverges from the path defined by said other portion at a switch point, and signal means responsive to the passage of the vehicle over said switch point adapts the direction sensing unit of said one steerable wheel to produce steering signals from said one portion.

6. A driverless vehicle according to claim 1 wherein the circuit means for each of the steerable wheel includes switch means for selectively rendering the circuit means operative and inoperataive.

7. A driverless vehicle according to claim 1 further including means for manually controlling said vehicle.

8. A driverless vehicle according to claim 7 wherein said manual control means includes means for manually steering one of said steerable wheels and means for manually operating said drive means.

9. A driverless vehicle according to claim 8 wherein said manual steering means is operably associated with the one steerable wheel to which said drive means is connected.

10. A driverless vehicle according to claim 9 wherein said manual control means includes switch means for selectively rendering said circuit means of the other steerable wheel operable whereby the other steerable wheel is controllable by operation of its steering motor in response to said steering signals while the one steerable wheel is controllable manually.

11. A driverless vehicle movable forwardly and rearwardly along a guide path provided on a surface over which the vehicle travels;
    said vehicle including a frame having a front end and a rear end;
    wheel means for supporting the frame including a front steerable wheel mounted for steering movement about a steering axis located adjacent to the front end of the frame, a rear steerable wheel mounted for steering movement about a steering axis located adjacent to the rear end of the frame, each of said steerable wheels having a steering motor arranged to move such steerable wheel about the steering axis therof;
    a guidance system for independently regulating the operation of the steering motor for each of the steerable wheels, said guidance system including for each steerable wheel a forward direction sensing unit, a rearward direction sensing unit, means mounting said sensing units forwardly and rearwardly respectively of each steerable wheel for movement with steering movements thereof, said sensing units being adapted to produce steering signals from the guide path when the vehicle is traveling in the forward and in the rearward direction respectively, and separate circuit means for regulating the operation of each steering motor in response to said steering signals whereby each of the steerable wheels is independently controlled to follow the guide path; and,
    reversible drive means operably connected to one of said steerable wheels for propelling the vehicle.

* * * * *

UNITED STATES PATENT AND TRADEMARK OFFICE
CERTIFICATE OF CORRECTION

PATENT NO. : 4,044,853
DATED : August 30, 1977
INVENTOR(S) : George A. Melke

It is certified that error appears in the above-identified patent and that said Letters Patent are hereby corrected as shown below:

Col. 1, line 14, "of" should read -- or --;

line 29, "axis adjacent" should read -- axis located adjacent --;

Col. 3, lines 6 and 7, delete "the guidance wheel 18,";

Col. 4, line 6, "No. 3,411,603.1" should read -- No. 3,411,603. -- ;

line 15, "43-45" should read -- 42-45 --;

line 26, "magents" should read -- magnets --;

line 44, "steerably" should read -- steerable --;

Col. 5, line 40, "signal" should read -- signals --;

Col. 6, line 11, "wheel" should read -- wheels --.

Signed and Sealed this

Twenty-fourth Day of January 1978

[SEAL]

Attest:

RUTH C. MASON
Attesting Officer

LUTRELLE F. PARKER
Acting Commissioner of Patents and Trademarks